US008601428B2

(12) United States Patent
Burrell et al.

(10) Patent No.: US 8,601,428 B2
(45) Date of Patent: Dec. 3, 2013

(54) SYSTEM AND METHOD FOR USE CASE-BASED THERMAL ANALYSIS OF HEURISTICALLY DETERMINED COMPONENT COMBINATIONS AND LAYOUTS IN A PORTABLE COMPUTING DEVICE

(75) Inventors: James D. Burrell, San Diego, CA (US); Zhongping Bao, San Diego, CA (US); Liang Cheng, San Diego, CA (US); Damion B. Gastelum, San Diego, CA (US); Gary D. Good, San Diego, CA (US); Mohammed A. Tantoush, San Diego, CA (US); Jon J. Anderson, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/537,309

(22) Filed: Jun. 29, 2012

(65) Prior Publication Data

US 2013/0167103 A1 Jun. 27, 2013

Related U.S. Application Data

(60) Provisional application No. 61/569,995, filed on Dec. 13, 2011.

(51) Int. Cl.
*G06F 11/22* (2006.01)
*G06F 17/50* (2006.01)

(52) U.S. Cl.
USPC ........... 716/136; 716/110; 716/132; 716/133; 716/135; 716/137

(58) Field of Classification Search
USPC .......... 716/110–117, 118–125, 132–137, 139
See application file for complete search history.

(56) References Cited

U.S. PATENT DOCUMENTS

| 4,912,664 | A | 3/1990 | Weiss et al. |
| 5,550,750 | A | 8/1996 | Wolff |
| 5,644,687 | A | 7/1997 | Agonafer et al. |
| 6,389,582 | B1 | 5/2002 | Valainis et al. |
| 2006/0031794 | A1 | 2/2006 | Li et al. |
| 2006/0294436 | A1* | 12/2006 | Sakai .............................. 714/39 |
| 2009/0019411 | A1* | 1/2009 | Chandra et al. .................... 716/9 |
| 2011/0040529 | A1* | 2/2011 | Hamann et al. .................... 703/1 |
| 2012/0279952 | A1* | 11/2012 | Vanalli et al. ................. 219/209 |
| 2012/0304137 | A1* | 11/2012 | Pramono et al. ............. 716/109 |
| 2012/0311357 | A1* | 12/2012 | Andrews ....................... 713/320 |

OTHER PUBLICATIONS

"Analysis on Thermal Reliability of Key Electronic Components on PCB Board", by Shaoting Xu, Xunbo Li, IEEE @2011.*

(Continued)

*Primary Examiner* — Nha Nguyen
(74) *Attorney, Agent, or Firm* — Nicholas A. Cole

(57) ABSTRACT

Various embodiments of methods and systems for heuristic determination and thermal analysis of component placement on a printed circuit board ("PCB") for use in a portable computing device ("PCD") are disclosed. It is an advantage of embodiments that thermal energy generating components, such as processors, may be heuristically selected and arranged on a selected PCB according to varying layouts and combinations and then evaluated for thermal dissipation efficiency under an assortment of use case scenarios. In this way, users of the system and method may quickly narrow down commercially feasible component layouts, identify the most efficient layouts and then heuristically modify the layouts to develop an optimal arrangement.

36 Claims, 12 Drawing Sheets

(56) References Cited

OTHER PUBLICATIONS

Bourbel, Mouland, Electronic Information Exchange, Nov. 1, 2002, http://www.electronics-cooling.com/2002/11/electronic-information-exchange/, accessed Dec. 30, 2011, eight pages.

Hauck T., et al.,"Electro-thermal simulation of multichannel power devices on PCB with SPICE", Thermal Investigations of ICS and Systems, 2009. Therminic 2009. 15th International Workshop on, IEEE, Piscataway, NJ, USA, Oct. 7, 2009, pp. 124-129, XP031570778, ISBN: 978-1-4244-5881-3.

International Search Report and Written Opinion—PCT/US2012/064317—ISA/EPO—Feb. 4, 2013.

Shankaran G.V., et al.,"Orthotropic thermal conductivity and Joule heating effects on the temperature distribution of printed circuit boards", Thermal and Thermomechanical Phenomena in Electronic Systems (ITHERM), 2010 12th IEEE Intersociety Conference on, IEEE, Piscataway, NJ, USA, Jun. 2, 2010, pp. 1-9, XP031702312, ISBN: 978-1-4244-5342-9.

Wang B.T., et al.,"A refined finite element model verification for IC packaged PCB with thermal effects", Microsystems Packaging Assembly and Circuits Technology Conference (IMPACT), 2010 5th International, IEEE, Piscataway, NJ, USA, Oct. 20, 2010, pp. 1-4, XP031858755, ISBN: 978-1-4244-9783-6.

* cited by examiner

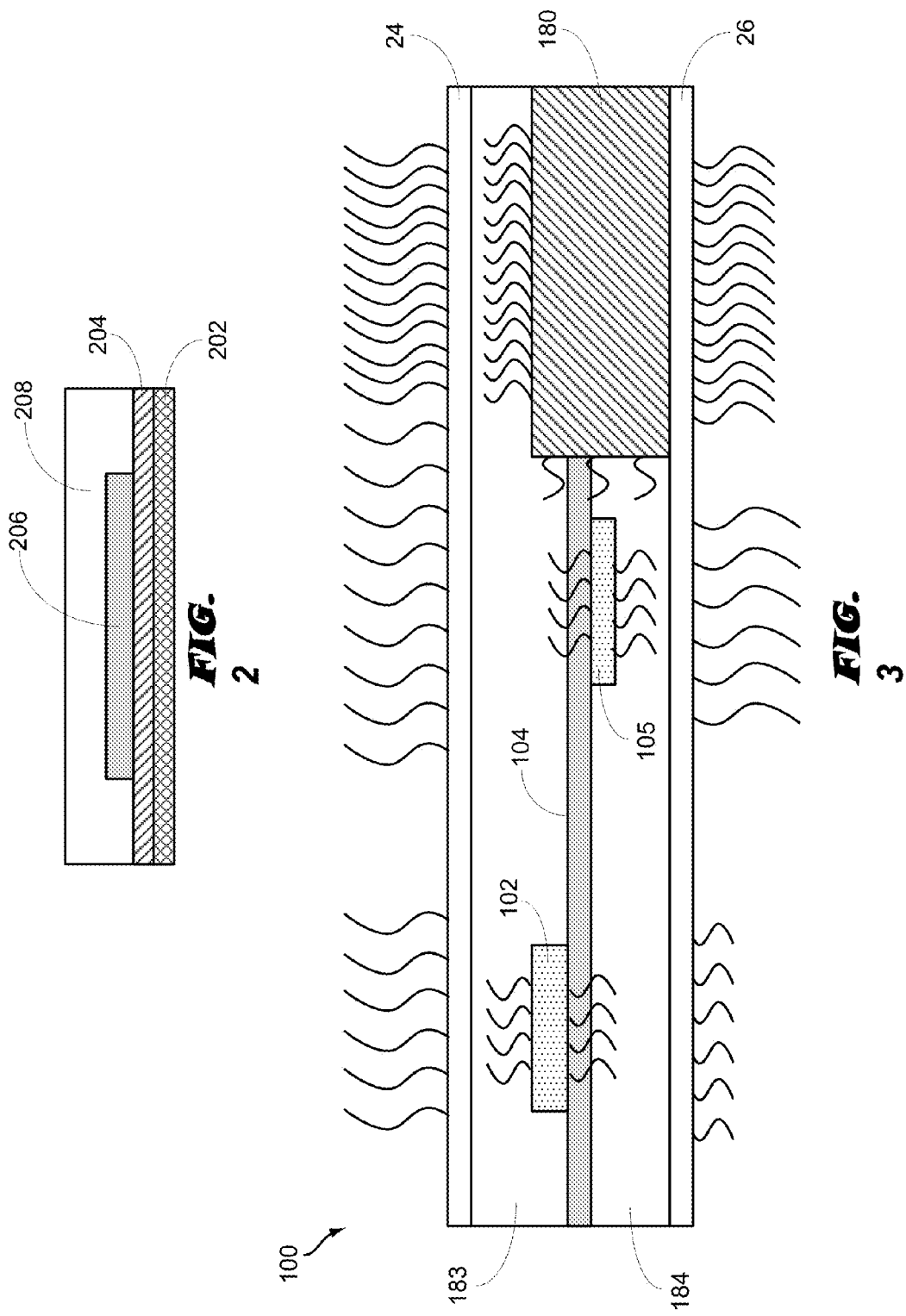

General Configuration

| | Value | Units |
|---|---|---|
| T ambient (Ambient Temperature) | 50 | °C |
| PCD length (x) | 125.0 | mm |
| PCD length (y) | 60.0 | mm |
| PCD thickness (z) | 14.0 | mm |
| LCD thickness | 5.0 | mm |
| PCB thickness | 1.0 | mm |
| Backside Cover thickness | 1.0 | mm |
| Battery thickness | 5.8 | mm |
| Air gap between LCD and PCB | 5.2 | mm |
| Air gap between LCD and Battery | 2.2 | mm |
| Total number of Packages on PCB | 4 | N/A |

PCB and Battery

|  | Length (x) [mm] | Width (y) [mm] | X centroid [mm] | Y centroid [mm] | Total Metal Layer | Metal Percentage |
|---|---|---|---|---|---|---|
| PCB-1 | 50.0 | 60.0 | 25.0 | 30.0 | 8.00 | 90.0 |
| PCB-2 | 50.0 | 60.0 | 75.0 | 30.0 | 8.00 | 90.0 |
| PCB-3 | 25.0 | 60.0 | 112.5 | 30.0 | 8.00 | 90.0 |
| Battery | 30.0 | 30.0 | 65.0 | 75.0 | N/A | N/A |

FIG. 8B

IC Package Placement

| Package | Package Centroid [mm] | | PCB Mount Side | Output Package Positioning Interference Check (1 indicates overlap) | | | | | | | | | |
|---|---|---|---|---|---|---|---|---|---|---|---|---|---|
|  | Xcenter | Ycenter |  | Model 1 | Model 2 | Model 3 | Model 4 | Model 5 | Model 6 | Model 7 | Model 8 | Model 9 | Model 10 |
| Model 1 | 24.25 | 27.00 | LCD side | 1 | 1 | 1 | 1 | #N/A | #N/A | #N/A | #N/A | #N/A | #N/A |
| Model 2 | 12.00 | 12.00 | LCD side | 1 | 1 | 1 | 1 | #N/A | #N/A | #N/A | #N/A | #N/A | #N/A |
| Model 3 | 28.00 | 12.00 | LCD side | 1 | 1 | 1 | 1 | #N/A | #N/A | #N/A | #N/A | #N/A | #N/A |
| Model 4 | 12.00 | 50.00 | LCD side | 1 | 1 | 1 | #N/A | #N/A | #N/A | #N/A | #N/A | #N/A | #N/A |
| Model 5 | 1.50 | 10.00 | LCD side | #N/A | #N/A | #N/A | #N/A | #N/A | #N/A | #N/A | #N/A | #N/A | #N/A |

FIG. 8C

IC Package Construction

| Package | | Package Components | Dimensions | | | BGA pitch [mm] |
|---|---|---|---|---|---|---|
| | | | Length (x) [mm] | Width (y) [mm] | Thickness (z) [mm] | |
| Model 1 | | Die | 9.83 | 8.72 | 0.10 | |
| | | Substrate | 14.00 | 14.00 | 0.30 | |
| | | BGA | | | 0.17 | 0.50 |
| | | Mold Compound | | | 0.55 | |
| Model 2 | | Die | 6.55 | 6.55 | 0.10 | |
| | | Substrate | 7.00 | 7.60 | 0.30 | |
| | | BGA | | | 0.17 | 0.50 |
| | | Mold Compound | | | 0.55 | |
| Model 3 | | Die | 3.83 | 4.40 | 0.14 | |
| | | Substrate | 3.83 | 4.40 | 0.14 | |
| | | BGA | | | 0.14 | 0.40 |
| | | Mold Compound | | | 0.28 | |
| Model 4 | | Die | 5.70 | 7.20 | 0.15 | |
| | | Substrate | 9.00 | 9.00 | 0.41 | |
| | | BGA | | | 0.17 | 0.40 |
| | | Mold Compound | | | 0.53 | |
| Model 5 | | Die | 2.80 | 2.40 | 0.14 | |
| | | Substrate | 2.80 | 2.40 | 0.14 | |
| | | BGA | | | 0.20 | 0.50 |
| | | Mold Compound | | | 0.28 | |

FIG. 8D

Device Power Dissipation [W]

| Package | Game | Use Case | | | |
| --- | --- | --- | --- | --- | --- |
| | | Data | Camera | HDMI | Voice |
| Model 1 | 0.750 | 0.000 | 0.000 | 0.000 | 0.000 |
| Model 2 | 0.200 | 0.000 | 0.000 | 0.000 | 0.000 |
| Model 3 | 0.100 | 0.000 | 0.000 | 0.000 | 0.000 |
| Model 4 | 0.200 | 0.000 | 0.000 | 0.000 | 0.000 |
| Model 5 | 0.100 | 0.000 | 0.000 | 0.000 | 0.000 |
| Battery | 1.000 | | | | |
| Total Power | 2.35 | | | | |

FIG. 8E

Calculated Temperature Results

| Package | Output: Max Temperature | | | | |
| --- | --- | --- | --- | --- | --- |
| | Game [°C] | Data [°C] | Camera [°C] | HDMI [°C] | Voice [°C] |
| Model 1 | 94.9 | 0.000 | 0.000 | 0.000 | 0.000 |
| Model 2 | 91.7 | 0.000 | 0.000 | 0.000 | 0.000 |
| Model 3 | 88.7 | 0.000 | 0.000 | 0.000 | 0.000 |
| Model 4 | 86.0 | 0.000 | 0.000 | 0.000 | 0.000 |
| Model 5 | 0.0 | 0.000 | 0.000 | 0.000 | 0.000 |
| Battery | 98.1 | | | | |

FIG. 8F

SYSTEM AND METHOD FOR USE CASE-BASED THERMAL ANALYSIS OF HEURISTICALLY DETERMINED COMPONENT COMBINATIONS AND LAYOUTS IN A PORTABLE COMPUTING DEVICE

CROSS-REFERENCE TO RELATED APPLICATIONS

Priority under 35 U.S.C. §119(e) is claimed to the U.S. provisional application entitled "SYSTEM AND METHOD FOR USE CASE-BASED THERMAL ANALYSIS OF HEURISTICALLY DETERMINED COMPONENT COMBINATIONS AND LAYOUTS IN A PORTABLE COMPUTING DEVICE," filed on Dec. 13, 2011 and assigned application Ser. No. 61/569,995, the entire contents of which are hereby incorporated by reference.

DESCRIPTION OF THE RELATED ART

Simulation software is a useful and indispensible tool for any engineer or designer fortunate enough to have access to a program specifically designed for the task at hand. A computer running a simulation software program is the preferred tool for most engineers and designers seeking to quantify heterogeneous component combinations in order to optimize a product design. The output of a simulation program can provide engineers with an optimum design and precise system configurations even before an initial prototype is built. Even though general simulation programs, both simple and robust, are commonplace in today's world of engineers and designers, surprisingly the simulation programs available to designers of a portable computing device ("PCD") which does not utilize any active cooling devices, like fans, are lacking. Typical simulation applications used for the analysis of PCD designs, such as commercially available finite element analysis packages and computational fluid dynamics packages, are not ideal for PCD component layout design evaluation because such applications are not easily capable of determining the thermal footprint for multiple processing component combinations and layouts according to multiple exemplary PCD use cases. Moreover, existing simulation systems and methods can be expensive and demand excessive amounts of designer time due to the complexity involved in using them to build a thermal footprint model.

Thus, for thermal analysis of multiple layouts of heterogeneous components operating under multiple theoretical use cases, existing simulation systems and methods are inadequate. The seamless thermal integration of myriad interdependent components is necessary in order to realize an optimum level quality of service ("QoS") in a PCD. Clearly, therefore, there is a need in the art for a thermal simulation system specifically suited for the planning, design and optimization of PCD component arrangements that include components of varying specifications applied across varying use cases.

SUMMARY OF THE DISCLOSURE

Various embodiments of methods and systems for heuristic determination and thermal analysis of component placement on a printed circuit board ("PCB") for use in a portable computing device ("PCD") which does not have any active cooling devices, like fans, are disclosed. Further, it is envisioned that certain embodiments of the systems and methods may be suitable for heuristic determination and thermal analysis of device architecture and construction in general including, but not limited to, component placement on PCBs, circuit board design strategies, on-die floor plans for chips, etc.

It is an advantage of embodiments that thermal energy generating components, such as processing components, may be heuristically selected and arranged on a selected PCB according to varying layouts and combinations and then evaluated for thermal dissipation efficiency under an assortment of use case scenarios. In this way, users of the system and method may quickly narrow down commercially feasible component layouts, identify the most efficient layouts and then heuristically modify the layouts to develop an optimal arrangement for a PCD.

One exemplary method includes selecting one or more PCBs from a pool of PCBs suitable for use in a given PCD. Next, one or more thermal energy generating components, such as processing components, may be selected for inclusion on the PCB. A selection of a thermal energy generating component may further include the entry of specification data associated with the component. Once the PCB and thermal generating components, i.e. packages, are selected, a number of options for layout of the packages on the PCB may be heuristically determined by the user. Additionally, one or more use cases under which the user desires the heuristically determined layouts to be evaluated may be identified. A selection of a use case may further include the entry of performance data associated with the selected packages. Subsequently, the various layouts may be evaluated on a use case by use case basis to determine which of the heuristically determined layouts may provide the most efficient dissipation of thermal energy. Notably, one of ordinary skill in the art will understand that efficient dissipation of thermal energy in a PCD advantageously provides for high quality of service ("QoS") as the need to throttle performance in favor of thermal energy mitigation is reduced.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

FIG. 2 is an illustration of the various layers that may be included in an exemplary package component that may reside on the PCB of the PCD of FIG. 1;

FIG. 3 is a plan view of the PCD of FIG. 1 illustrating thermal energy dissipation that may occur under a given use case;

FIGS. 8A-8F are exemplary tables illustrating data inputs and outputs according to one embodiment of a system for heuristic determination and thermal analysis of component placement on the PCB of FIG. 1;

DETAILED DESCRIPTION

Figure 1A:
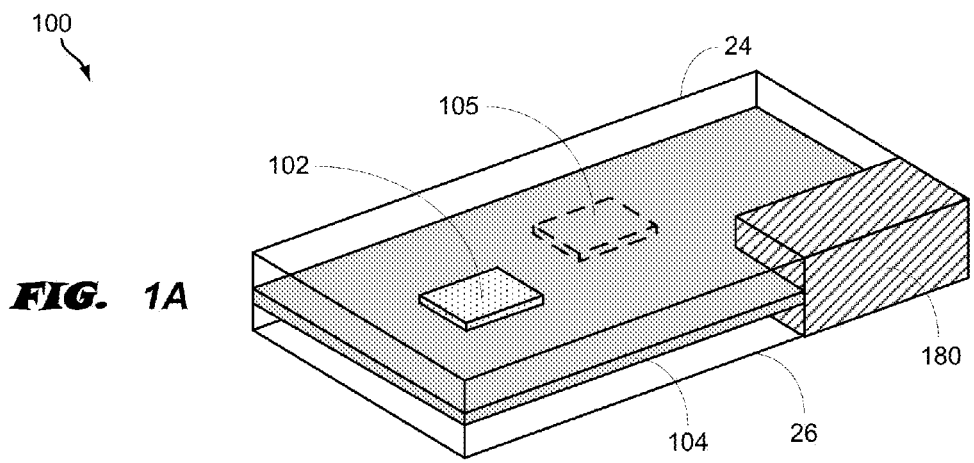
FIGS. 1A-1C are isometric, top, and plan views, respectively, of an exemplary spatial layout of a portable computing device ("PCD") that includes a liquid crystal display ("LCD") layer, a printed circuit board ("PCB") layer with an exemplary component layout, and a backside cover layer.

The word "exemplary" is used herein to mean "serving as an example, instance, or illustration." Any aspect described herein as "exemplary" is not necessarily to be construed as exclusive, preferred or advantageous over other aspects.

In this description, the terms "application" and "app" may also include files having executable content, such as: object code, scripts, byte code, markup language files, and patches. In addition, an "application" or "app" referred to herein, may also include files that are not executable in nature, such as documents that may need to be opened or other data files that need to be accessed.

As used in this description, the terms "component," "database," "module," "system," "thermal energy generating component," "processing component," "package" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, it will be understood that the terms "thermal" and "thermal energy" may be used in association with a device or component capable of generating or dissipating energy that can be measured in units of "temperature." Consequently, it will further be understood that the term "temperature," with reference to some standard value, envisions any measurement that may be indicative of the relative warmth, or absence of heat, of a "thermal energy" generating device or component. For example, the "temperature" of two components is the same when the two components are in "thermal" equilibrium.

In this description, the terms "workload," "process load" and "process workload" are used interchangeably and generally directed toward the processing burden, or percentage of processing burden, associated with a given processing component in a given embodiment. Further to that which is defined above, a "processing component," "thermal energy generating component," "package" or "thermal aggressor" may be, but is not limited to, a central processing unit, a graphical processing unit, a core, a main core, a sub-core, a processing area, a hardware engine, etc. or any component or combination of components residing within, or external to, an integrated circuit within a portable computing device. Moreover, to the extent that the terms "thermal load," "thermal distribution," "thermal signature," "thermal processing load," "thermal footprint" and the like are indicative of workload burdens that may be running on a processing component, one of ordinary skill in the art will acknowledge that use of these "thermal" terms in the present disclosure may be related to the quality of service ("QoS") provided to a user of a device that includes a processing component. Moreover, one of ordinary skill in the art will recognize that the QoS level of a device may be related to both the performance/processing power of the device as well as the thermal characteristic of the device and its relative ability to stay cool under use cases requiring heavy processing workloads.

In this description, the terms "integrated circuit," "IC," "system on a chip," "SoC," "package" and "chip" are used interchangeably. The terms "printed circuit board" and "PCB" are meant to refer to the structural component used to mechanically support and electrically connect electronic components such as packages by using conductive pathways, tracks or signal traces. As is known in the art, a printed circuit board may also be referred to as printed wiring board ("PWB") or etched wiring board. A PCB populated with electronic components may be termed a printed circuit assembly ("PCA") or a printed circuit board assembly ("PCBA").

In this description, the term "portable computing device" ("PCD") is used to describe any device operating on a limited capacity power supply, such as a battery, and which does not have any active cooling devices, such as a fan. Although battery operated PCDs have been in use for decades, technological advances in rechargeable batteries coupled with the advent of third generation ("3G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop computer with a wireless connection, at tablet, among others. In general, the exemplary embodiments in this specification are described within the context of a PCD, however, one of ordinary skill in the art will recognize that certain embodiments are not limited to applications associated with PCDs and may be suitable for applications associated with actively cooled devices. As such, the scope of the disclosure will not limited in application to PCDs.

The word "heuristic" and its conjugates, as used in this description describe any experience-based technique for selecting components and determining a proposed layout of those components relative to each other. Because an exhaustive analysis of all possible combinations and layouts of thermal energy generating components in a PCD is impractical, embodiments of the systems and methods leverage heuristic techniques of a user to expedite the process of finding a satisfactory component layout. Examples of heuristics that may be facilitated by embodiments of the systems and methods include, but are not limited to, a "rule of thumb," an educated guess, an intuitive judgment, common sense, graphical renderings, previously successful layouts, etc.

The various embodiments presented in this disclosure relate generally to design and planning simulation software and, more particularly, to a system and method for leveraging a set of heuristically determined component layouts along with known performance data to identify a practical layout of thermal aggressors that may provide the optimal thermal dissipation performance in a PCD. The present disclosure provides, among other things, a solution to the above-described needs in the art, as well as other needs in the art, by providing a system and method for comparing multiple heuristically determined PCD component combinations by generating a thermal footprint for each combination according to multiple exemplary PCD use cases.

In general, some embodiments are described as utilizing a personal computer, server, or other computational device to design, refine and optimize a PCD component layout through algorithms embodied in a software application residing on the computational device. In certain embodiments or systems, the computational device charged with running the simulation software is communicatively coupled to a database containing technical specifications of various models of components, or packages, which could be used in a given PCD, while other embodiments may have the database of PCD component technical specifications reside on the same computational device as does the simulation software. In still other embodiments, the algorithms used by the simulation software may be modifiable or selectable by a user, in other embodiments not. Also, some embodiments of the invention are operable to provide a user a graphical output of a thermal footprint including predicted touch temperature hot spots via a graphical user interface from which the user may heuristically iterate the layout to optimize performance.

The present disclosure describes at least one embodiment that provides the functionality to quickly and easily simulate proposed PCD component layouts operating under one or more hypothetical use cases in order to predict a thermal footprint and corresponding QoS level. It is envisioned that some embodiments may also be operable to optimize component selections and locations within a heuristically determined layout to predict optimum thermal footprints and QoS levels. Notably, as one of ordinary skill in the art will recognize, a thermal footprint generated by an embodiment of the systems and methods may include the predicted location and temperature of touch temperature hot spots on the external surface of a PCD. To transform data associated with hypothetical use cases and performance specifications of selected PCD components, the exemplary systems may employ a series of specialized algorithms to compile and simulate user selected PCD components to generate a theoretical contribution to an overall thermal footprint. Once each component is selected by a user, the system simulates and predicts an overall thermal footprint for the proposed component layout under various use cases via a simulation engine. The thermal footprint may then be used by the user to either modify one or more proposed layouts or select a satisfactory layout from among those evaluated.

The various embodiments described may dramatically improve the process of selecting and arranging thermal energy generating components to optimize user experience with PCDs by increasing the efficiency at which a PCD designer can configure, evaluate and compare complex component combinations and layout options in a PCD. The disclosed systems and methods provide users with the ability to consistently produce thermally efficient component selections and layouts in PCDs.

It is envisioned that some embodiments may include a series of editor modules capable of processing user data inputs and identifying a best practice component selection and layout location for that component. While the editor modules, and the specific algorithms used by a given editor module, may be unique aspects for some embodiments, it will be understood that component selection and location determination editor modules are not required in all embodiments or implementations. That is, a given embodiment may, or may not, include an editor module. Further, the types of editor modules, the algorithms and calculations run by editor modules, or the use of an editor module output by a thermal simulation engine is offered only as a non-limiting example of a certain class of embodiments.

Further, it is envisioned that some embodiments may include a database of PCD component specifications. As is understood by those with skill in the art, a database aspect may be operable to be automatically updated with new or modified component specifications and performance data via the Internet, compact disc, or other means. Additionally, the particular location or characteristics of the comprehensive data stored in a database aspect, however, is not in any way limiting but rather is provided as a non-limiting example. In fact, in some embodiments a database may not be included as the data input to the system may originate entirely from the user or some other source.

Within an exemplary data input interface, the user may input general configuration data for a specific PCD including, but not limited to, an ambient temperature to which the PCD may be exposed, the dimensions of the PCD, the dimensions of components within the PCD, materials of construction for components within the PCD, etc. Subsequently, the user may select various printed circuit board ("PCB") geometries along with various combinations of thermal energy generating components, or packages, which may reside on each of the PCB geometries. Next, for each PCB geometry, the user may select package placement on the PCBs and verify that such placement would not result in physical interference between two or more packages. Notably, as is understood by those with skill in the art, packages may be located on either of two sides of a given PCB, the "LCD side" which faces the screen of the PCD or the "backside" with faces the rear cover of the PCD. The user may also be required to input the dimensions and specifications related to the selected packages including, but not limited to, the length and width of the die and substrate levels, the pitch of the ball grid array, the mold compound, etc., although it is envisioned that some embodiments may query such inputs from a database based on simple selection of a package model by the user. Also, the user may be required to input power consumption data associated with each selected package and according to various use cases such as, but not limited to, gaming use cases, data transceiving use cases, camera-based use cases, HDMI video based use cases, voice data transceiving use cases, etc.

For the purpose of data input and package location on a PCB, it is envisioned that some embodiments may employ a form-based user interface while others may use a visual-based user interface. The user interface may be provided through a personal computer ("PC") based application, a web based application, a mobile device app or otherwise. User interfaces may be of a graphical user interface (GUI) type as is known to those skilled in the art. Convenient features such as "point & click" as well as drop down type menus, hyperlinks, virtual buttons, auto-correct and format capabilities, and other common GUI features are known to those skilled in the art of software interfaces and, while such features may be novel in and of themselves, should not be considered required or limiting features.

The abilities of PCD designers to heuristically account for thermal generation and dissipation in a PCD vary largely. At one end of the scale, PCD designers will simply not consider thermal generation and dissipation issues that may result from modern use cases, preferring instead to just continue to build according to previous designs. At some point, the approach generates lower and lower QoS levels related to thermal dissipation issues because the increased feature set and performance requirements of the device cause power consumption to increase from previous generations of products. Exemplary embodiments of a system and method for choosing component combinations and layouts within PCD, based on thermal energy generation and dissipation under sample use cases, will be described in detail in the following figures.

In general, the exemplary embodiments divide the spatial domain of a given PCD, determine material properties, geometries, location and power consumption levels for the proposed components within each division of the spatial domain and then leverage the information to generate thermal footprints. Based on the thermal footprints, which are generated in association with sample use cases, PCD designers can evaluate the various layouts to determine which layout would provide a user of the PCD with the highest QoS level. Moreover, as one of ordinary skill in the art will recognize, by using the systems and methods disclosed herein a PCD designer may determine component layouts for a PCD that optimize QoS of the PCD even under operating conditions that require thermal throttling of the PCD.

Figure 1B:
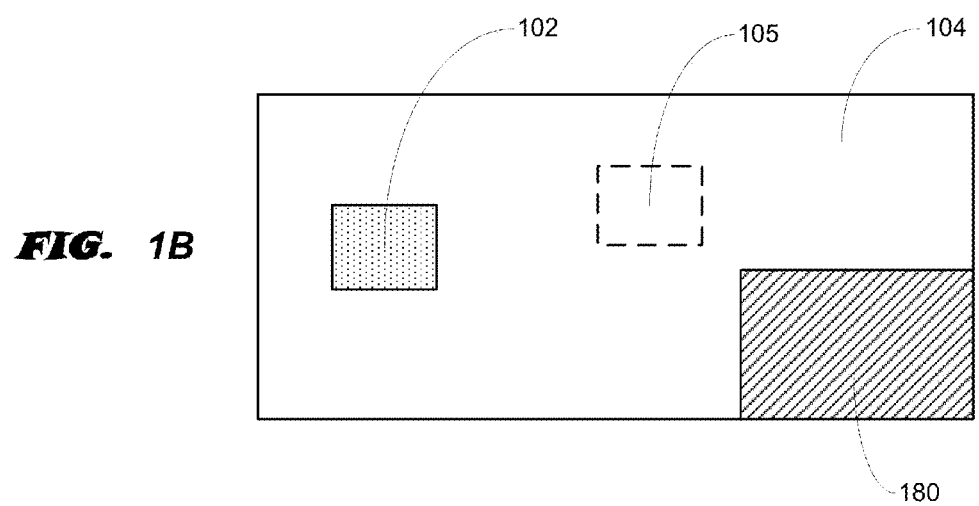
Figure 1C:
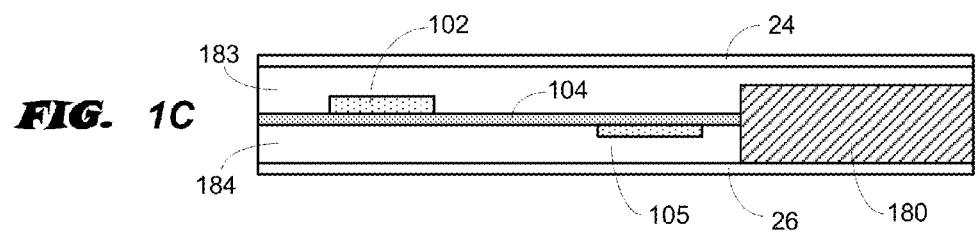

FIGS. 1A-1C are isometric, top, and plan views, respectively, of an exemplary spatial layout of a PCD 100 that includes a liquid crystal display ("LCD") layer 24, a PCB layer 104 with an exemplary component layout, and a backside cover layer 26. Notably, the FIG. 1 embodiment is not intended to represent a comprehensive layout of a PCD 100 but, rather, is offered for illustrative purposes. One of ordinary skill in the art will recognize that actual layouts within a PCD may include additional PCBs, PCBs with different geometries, additional packages residing on the PCB, packages residing exclusively on one side of the PCB, etc.

The exemplary PCD 100 has a PCB layer 104 sandwiched between an LCD side 24 and a backside cover 26. Various thermal energy producing packages such as, but not limited to, processing cores, modems, power management integrated circuits ("PMICs"), RF amplifiers, etc. are represented as residing at designated locations either on the LCD-side 24 or back cover-side 26 of the PCB 104. For purposes of simplicity, two packages 102, 105 are depicted on the LCD-side 24 and back cover-side 26, respectively, of the PCB 104 and will be repeatedly referred to throughout this specification in the context of a heuristically determined component layout on a PCB 104. One of ordinary skill in the art will recognize, however, that referral to packages 102, 105 for an exemplary layout is for illustrative purposes only and that additional packages and package types may reside on either or both sides of the PCB 104.

For any given PCD 100, overall dimensions including length, width and thickness are given and unchangeable. Moreover, one of ordinary skill in the art will recognize that for a given PCD 100 there may be a limited number of PCB 104 geometries suitable to be housed within the given PCD 100. Notably, PCB shape is understood by one of ordinary skill in the art to be a factor in thermal performance of a PCD 100 and, as such, heuristic selection of a PCB geometry can have a significant impact on the QoS ultimately delivered by the PCD 100 under certain use cases. Further, PCB 104 shape may dictate battery 180 location within a given PCD 100. On either side of the PCB 104, various embodiments assume air to fill the voids 183, 184 between the PCB 104 and the LCD 24 and backside cover 26, although it is envisioned that mediums other than air may be considered by some embodiments.

FIG. 2 is an illustration of the various layers that may be included in an exemplary package component 102, 105 that may reside on the PCB 104 of the PCD 100 of FIG. 1. As can be seen in the FIG. 2 illustration, a base layer 202 is made of a ball grid array of solder balls. As is understood in the art, the solder balls hold the package, such as packages 102, 105, in alignment with the circuit board and provide a means for conducting electrical signals from the package to the PCB 104. Notably, the density and type of ball grid array may impact thermal energy generation from a package to the PCB 104 layer.

As suggested above, the base layer 202 provides a connection between the PCB 104 and a substrate layer 204. As is understood in the art of package construction, the substrate layer 204 supports a smeared silicon layer 206 which is encapsulated in a mold layer 208.

FIG. 3 is a plan view of the PCD 100 of FIG. 1 illustrating thermal energy dissipation that may occur under a given use case and according to a heuristically determined layout of thermal aggressors. As can be seen from the FIG. 3 illustration, the various components 102, 105 residing on the PCB 104 generate thermal energy which must be dissipated in order to avoid loss of QoS. Notably, each component 102, 105 on the PCB 104, as well as components exterior to the PCB 104 such as the battery 180, may function as a thermal aggressor to adjacent components. In this way, the various thermal energy generating components may work together to cause thermal energy levels to be exceeded. Accordingly, the layout of the components in conjunction with component selection determines the amount and concentrations of thermal energy that must be dissipated from the PCD under any given use case. As one of ordinary skill in the art will recognize, each thermal aggressor within the PCD 100 may contribute more or less to the overall thermal footprint of the PCD 100 depending on the power it is required to consume under a given use case.

One of ordinary skill in the art will also understand that the ambient temperature of the environment around a thermal aggressor, such as packages 102, 105 and battery 180, significantly affects the ability of the thermal aggressor to dissipate thermal energy. Because thermal energy seeks equilibrium by dissipating from an area of high temperature to an area of lower temperature, a high ambient temperature in the environment surrounding a thermal aggressor will slow the dissipation rate and cause thermal limits of the PCD 100 to be exceeded at lower power consumption levels.

A common driver for determining when the performance of a PCD 100 must be sacrificed to mitigate thermal energy generation, thus reducing QoS, is the touch temperature. As is understood in the art, the touch temperature is the absolute temperature of the external surface of the PCD. Touch temperature is generally quantified in the art as the allowable rise in temperature over the ambient temperature, i.e. the difference in the external temperature of the device versus ambient temperature. As an example, if a device has an external temperature of 45 C and the ambient temperature in the room is 25 C, then the touch temperature is 20 C. Notably, touch temperature is the threshold that is typically reached first as a result of excessive thermal energy generation by thermally aggressive components in a PCD. The second common limit is the junction temperature of the die 206 which is the silicon in a package, such as packages 102, 105 of FIG. 1. The junction temperature limit is typically 125 C for a logic die 102, 150 C for an RF die 105, and 85-105 C for a memory die (not depicted in FIG. 1). Because the junction temperature limits are significantly higher than the touch temperature limit, it is typically the touch temperature that drives component layout in a PCD.

Thermal energy is generated in a PCD as the various components within the PCD are called upon to process tasks per a given use case. Thermal energy is generated in a PCD and must be dissipated through conductive and convective mediums before finally radiating from the surface of the PCD. As such, concentration of the thermal energy generated by a group of adjacent packages will cause the touch temperature of the PCD to be exceeded at a relatively low power level for the PCD, keeping QoS arbitrarily low. Generally speaking, the farther apart that thermal aggressors can reside on a PCB, the more efficient the PCD will be at dissipating energy and staying below a touch temperature threshold. The theoretical power limit of the PCD may be 4 watts due to its available surface area for passive heat dissipation, for example, but because of component placement, PCB size and location, the actual ability of the device to meet the rise over ambient touch temperature specification is limited to a power dissipation of 1 or 2 watts.

Figure 4:
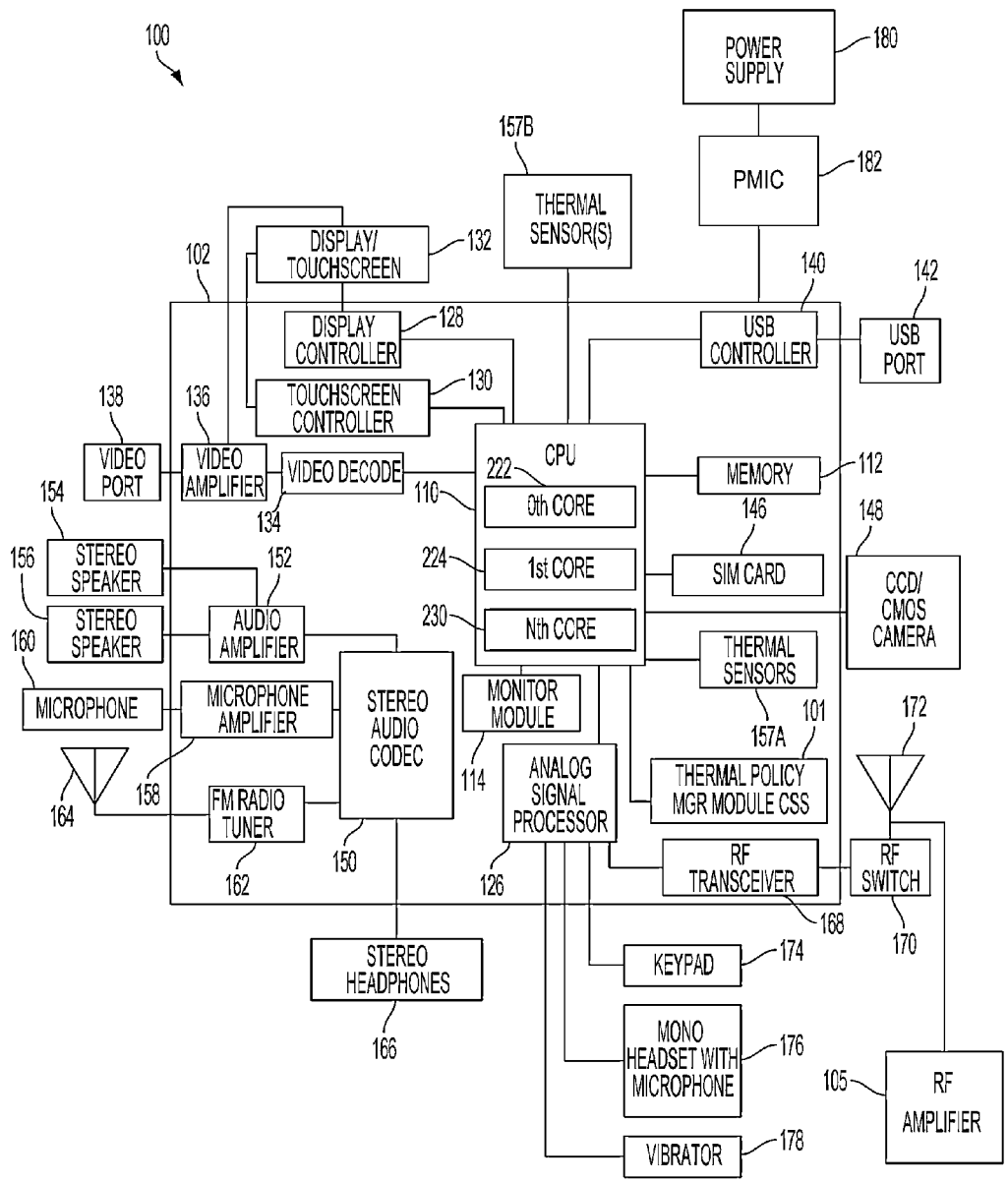
FIG. 4 is a functional block diagram illustrating an exemplary embodiment of a PCD.

FIG. 4 is a functional block diagram of an exemplary, non-limiting aspect of a PCD 100 in the form of a wireless telephone. As a result of package layout comparisons under sample workloads associated with various use cases, the QoS capabilities of PCD 100 may be optimized. As shown, the PCD 100 includes an on-chip system 102 that includes a multi-core central processing unit ("CPU") 110 and an analog signal processor 126 that are coupled together. The CPU 110 and the processor 126 are generally referred to throughout this specification as components that reside within the chip 102 which resides on the PCB 104. The CPU 110 may comprise a zeroth core 222, a first core 224, and an Nth core 230 as understood by one of ordinary skill in the art. Further, instead of a CPU 110, a digital signal processor package ("DSP") may also be employed as understood by one of ordinary skill in the art.

In general, the thermal policy manager module(s) ("TPM") 101 may be responsible for monitoring and applying thermal policies that include one or more thermal mitigation techniques that may help a PCD 100 manage thermal conditions and/or thermal loads and avoid experiencing adverse thermal conditions, such as, for example, reaching critical touch temperatures, while maintaining a high level of functionality. Notably, by employing systems and methods for determining optimum package layouts within PCD 100, thermal policies implemented by TPM 101 may be less drastic than in less efficient layouts.

FIG. 4 also shows that the PCD 100 may include a monitor module 114. The monitor module 114 communicates with multiple operational sensors (e.g., thermal sensors 157) distributed throughout the on-chip system 102 and with the CPU 110 of the PCD 100 as well as with the thermal policy manager module 101. The thermal policy manager module 101 may work with the monitor module 114 to identify adverse thermal conditions and apply thermal policies that include one or more thermal mitigation techniques.

As illustrated in FIG. 4, a display controller 128 and a touch screen controller 130 are coupled to the digital signal processor 110. A touch screen display 132 external to the on-chip system 102 is coupled to the display controller 128 and the touch screen controller 130.

PCD 100 may further include a video encoder 134, e.g., a phase-alternating line ("PAL") encoder, a sequential couleur avec memoire ("SECAM") encoder, a national television system(s) committee ("NTSC") encoder or any other type of video encoder 134. The video encoder 134 is coupled to the multi-core central processing unit ("CPU") 110. A video amplifier 136 is coupled to the video encoder 134 and the touch screen display 132. A video port 138 is coupled to the video amplifier 136. As depicted in FIG. 4, a universal serial bus ("USB") controller 140 is coupled to the CPU 110. Also, a USB port 142 is coupled to the USB controller 140. A memory 112 and a subscriber identity module (SIM) card 146 may also be coupled to the CPU 110. Further, as shown in FIG. 4, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 4, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 4 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 4 further indicates that a radio frequency ("RF") transceiver 168 may be coupled to the analog signal processor 126. An RF switch 170 may be coupled to the RF transceiver 168 and an RF antenna 172. An RF amplifier 105 external to the on-chip system 102 is coupled to the antenna 172. As shown in FIG. 4, a keypad 174 may be coupled to the analog signal processor 126. Also, a mono headset with a microphone 176 may be coupled to the analog signal processor 126. Further, a vibrator device 178 may be coupled to the analog signal processor 126. FIG. 4 also shows that a power supply 180, for example a battery, is coupled to the on-chip system 102 via a power management integrated circuit 182 ("PMIC"). In a particular aspect, the power supply includes a rechargeable DC battery or a DC power supply that is derived from an alternating current ("AC") to DC transformer that is connected to an AC power source.

The CPU 110 may also be coupled to one or more internal, on-chip thermal sensors 157A as well as one or more external, off-chip thermal sensors 157B. The on-chip thermal sensors 157A may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157B may comprise one or more thermistors. The thermal sensors 157 may produce a voltage drop that is converted to digital signals with an analog-to-digital converter ("ADC") controller 103 (See FIG. 5). However, other types of thermal sensors 157 may reside in a given PCD 100.

The touch screen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the RF amplifier 105, the keypad 174, the mono headset 176, the vibrator 178, thermal sensors 157B, the PMIC 182 and the power supply 180 are external to the on-chip system 102.

Figure 5:
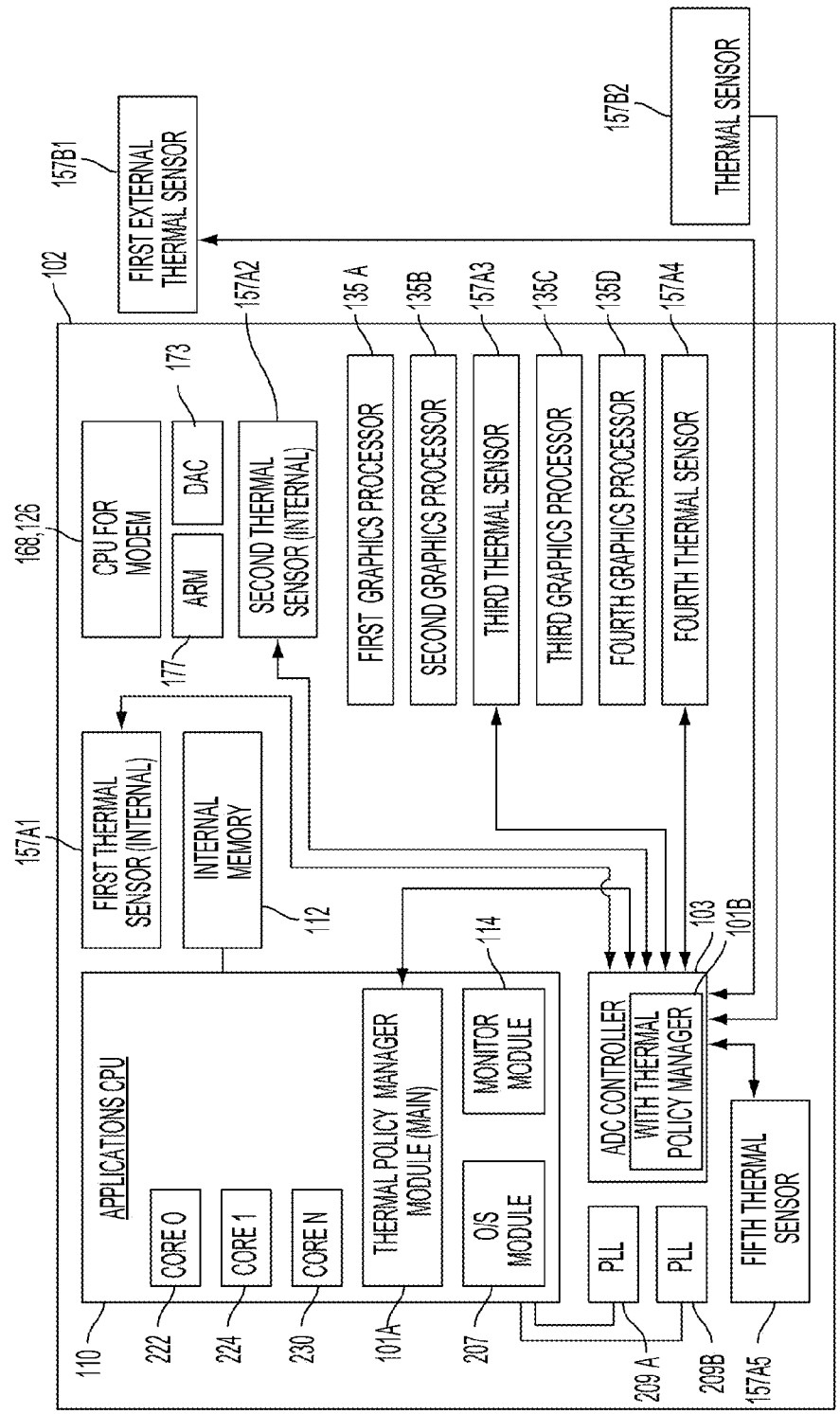
FIG. 5 is a functional block diagram illustrating an exemplary spatial arrangement of hardware for the chip illustrated in FIG. 4.

FIG. 5 is a functional block diagram illustrating an exemplary spatial arrangement of hardware for the chip 102 illustrated in FIG. 4. According to this exemplary embodiment, the applications CPU 110 is positioned on the far left side region of the chip 102 while the modem CPU 168, 126 is positioned on a far right side region of the chip 102. The applications CPU 110 may comprise a multi-core processor that includes a zeroth core 222, a first core 224, and an Nth core 230. The application CPU 110 is further illustrated to include operating system ("O/S") module 207 and a monitor module 114.

The applications CPU 110 may be coupled to one or more phase locked loops ("PLLs") 209A, 209B, which are positioned adjacent to the applications CPU 110 and in the left side region of the chip 102. Adjacent to the PLLs 209A, 209B and below the applications CPU 110 may comprise an analog-to-digital ("ADC") controller 103.

The on-chip or internal thermal sensors 157A may be positioned at various locations. For example, a first internal thermal sensor 157A1 may be positioned in a top center region of the chip 102 between the applications CPU 110 and the modem CPU 168,126 and adjacent to internal memory 112. A second internal thermal sensor 157A2 may be positioned below the modem CPU 168, 126 on a right side region of the chip 102. This second internal thermal sensor 157A2 may also be positioned between an advanced reduced instruction set computer ("RISC") instruction set machine ("ARM") 177 and a first graphics processor 135A. A digital-to-analog controller ("DAC") 173 may be positioned between the second internal thermal sensor 157A2 and the modem CPU 168, 126.

A third internal thermal sensor 157A3 may be positioned between a second graphics processor 135B and a third graphics processor 135C in a far right region of the chip 102. A fourth internal thermal sensor 157A4 may be positioned in a far right region of the chip 102 and beneath a fourth graphics processor 135D. And a fifth internal thermal sensor 157A5 may be positioned in a far left region of the chip 102 and adjacent to the PLLs 209 and ADC controller 103.

One or more external thermal sensors 157B may also be coupled to the ADC controller 103. The first external thermal sensor 157B1 may be positioned off-chip and adjacent to a top right quadrant of the chip 102 that may include the modem CPU 168, 126, the ARM 177, and DAC 173. A second external thermal sensor 157B2 may be positioned off-chip and adjacent to a lower right quadrant of the chip 102 that may include the third and fourth graphics processors 135C, 135D.

One of ordinary skill in the art will recognize that various other spatial arrangements of the hardware illustrated in FIG. 5 may be identified and evaluated in the design phase of a PCD 100 by a system and method for heuristic determination and thermal analysis of component placement on the chip 102. Further, it is envisioned that thermal footprints for proposed on-die layouts may also be leveraged by designers to determine optimum placement of thermal sensors 157 on and off the chip 102.

Figure 6:
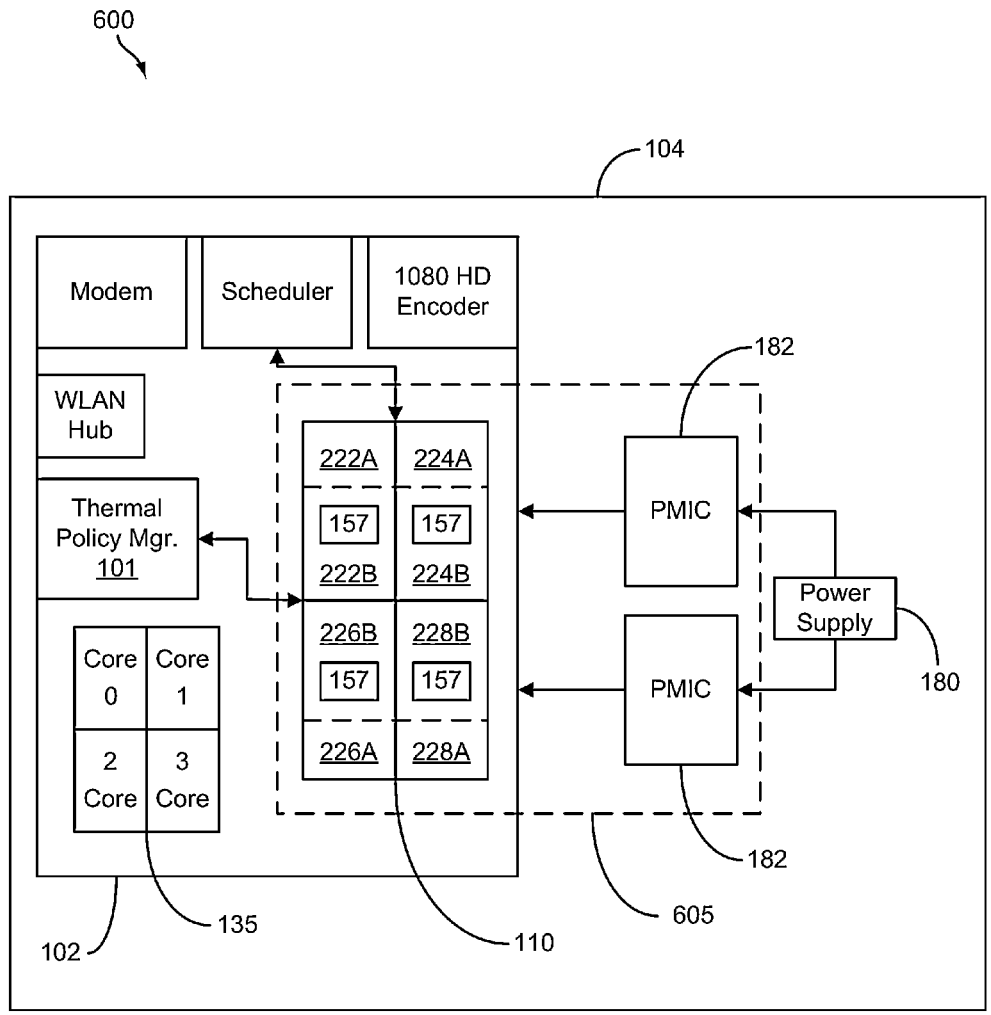
FIG. 6 is a functional block diagram illustrating an exemplary spatial arrangement of hardware for the chip illustrated in FIG. 4 and exemplary components external to the chip illustrated in FIG. 4.

FIG. 6 is a functional block diagram illustrating an exemplary spatial arrangement of components for the chip 102 illustrated in FIG. 4 and exemplary components on the PCB 104 external to the chip 102 illustrated in FIG. 4. FIG. 6 illustrates a portion of an exemplary floor plan 600 of a PCB 104 that may have been heuristically determined and optimized through thermal footprint analysis. In the FIG. 6 illustration, GPU bank 135 and CPU bank 110 represent the primary components generating thermal energy on chip 102.

Power management integrated circuits ("PMICs") 182, for example, do not reside on chip 102, but are represented as being in near proximity 605 on the PCB 104 to CPU bank 110. For example, due to limited physical space within a PCD 100, PMICs 182 may reside immediately behind and adjacent to chip 102 and function as thermal aggressors to components residing on chip 102. As such, one of ordinary skill in the art will recognize that thermal energy dissipated from a PMIC 182, or other heat generating component on PCB 104, may adversely affect thermal energy dissipation by any of cores 222, 224, 226, 228 within CPU 110.

PMICs 182, as well as other components residing within PCD 100 such as, but not limited to, RF amplifier 105, may be placed in immediate proximity 605 to a given processing core/package of an adjacent package such as chip 102, thereby generating a bias in the package for a higher average operating temperature when the thermal energy dissipated from the components propagates through the PCB 104 to the package. One of ordinary skill in the art will recognize that the adverse affect of these proximate components on package temperature can be mitigated by an iterative method of heuristic determination and thermal analysis of component placements on the PCB 104.

Figure 7:
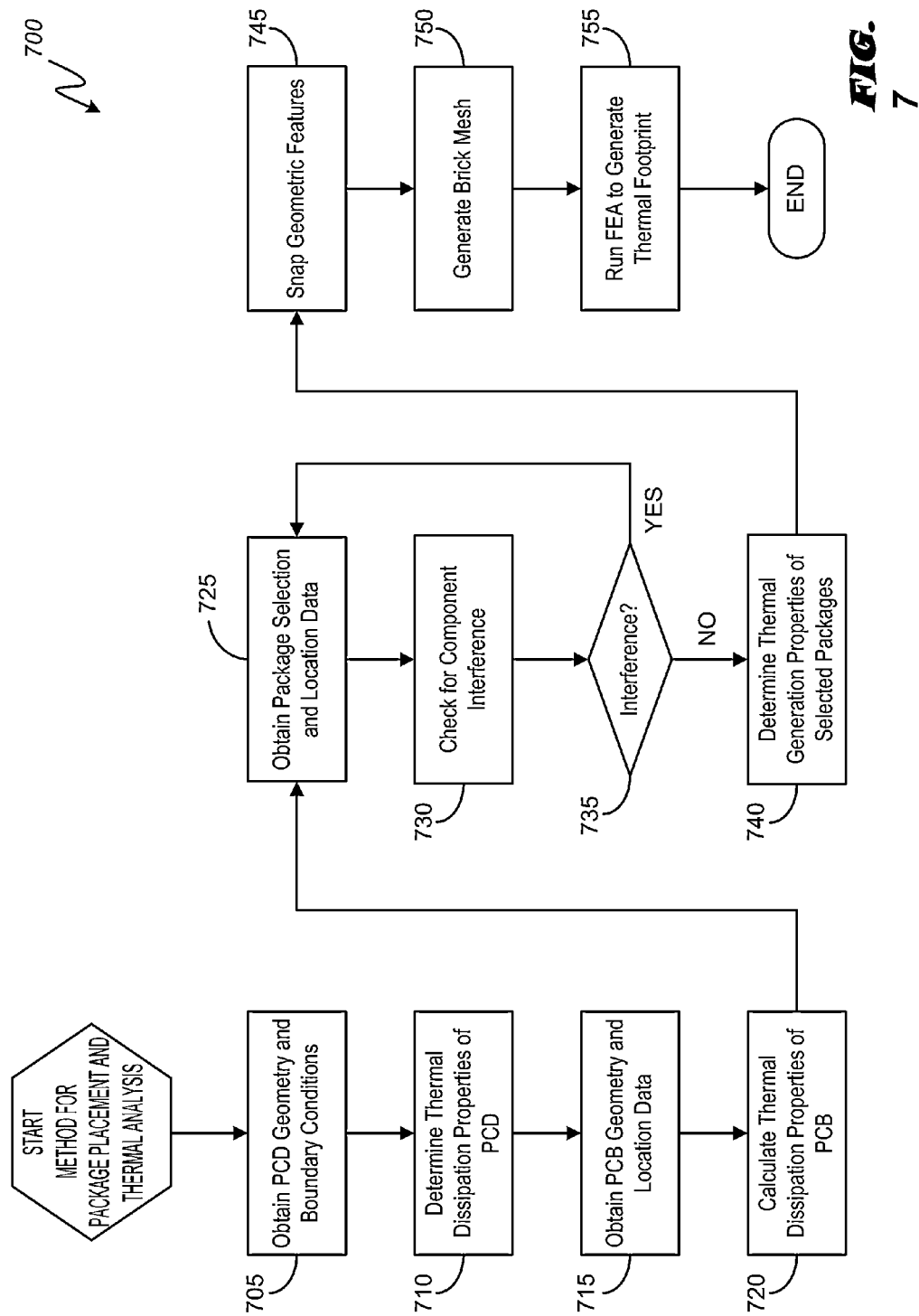
FIG. 7 is a logical flowchart illustrating an embodiment of a method for heuristic determination and thermal analysis of component placement on the PCB of FIG. 1.

FIG. 7 is a logical flowchart illustrating an embodiment of a method 700 for heuristic determination and thermal analysis of component placement on the PCB 104 of FIG. 1. Various data inputs relative to a given PCD 100 selected for evaluation and the components within the PCD 100 may be entered by a user of the system through a form-based interface. In an exemplary embodiment, the data may be entered into a series of tables such as those illustrated in FIG. 8. For illustrative purposes, the data entry and display tables depicted in FIG. 8 will be referred to throughout the description of the FIG. 7 method.

Beginning at block 705, PCD geometry and boundary conditions are entered into a user interface, such as the table 800A illustrated in FIG. 8A. As would be understood by one of ordinary skill in the art, the geometry and boundary conditions associated with a specific PCD 100 are a given and may include those outlined in the FIG. 8A table 800A such as, but not limited to, length, width and thickness of the overall PCD, air gaps distances between the PCB 104 and an exterior component of PCD 100. Moreover, the boundary conditions may include an ambient temperature such that at block 710 the thermal dissipation properties of the PCD 100 can be determined.

At block 715, the PCB 104 geometry is heuristically selected and entered into the user interface, such as may be represented by the table 800B illustrated in FIG. 8B. Subsequently, at block 720 the thermal properties of the PCB 104 may be calculated. To calculate the thermal properties of the PCB 104, certain embodiments quantify the construction of the PCB 104 by aggregating individual layer properties, copper density, etc. which individually and collectively impact the efficiency at which thermal energy propagates across the PCB 104. Generally, the denser the package population in the PCB 104 layout, the more copper is present on the PCB 104, thereby increasing the likelihood that thermal energy generated on the PCB 104 will conduct along the PCB 104 before radiating through an air gap 183, 184 and ultimately exiting the PCD 100. For instance, where:

n=total number of actual copper trace layers
$t_i$=thickness of the i-th copper layer trace
$V_i$=the copper percentage fraction (in plan view) of the i-th copper layer trace on the board
$k_i$=conductivity of the i-th copper layer trace on the board
$k_{board}$=conductivity of dielectric material of the board $k_{copper}$=conductivity of copper material of the board
b=thickness of the PCB
$k_{xy}$=conductivity of the PCB in plane of the trace (XY plane)
$k_z$=conductivity of the PCB normal to the trace (along Z direction)
then $$k_i = V_i \cdot k_{copper} + (1 - V_i) \cdot k_{board}$$

$$k_{xy} = \sum_{i=1}^{n} \left[ \frac{t_i}{b} \cdot k_i + \left(1 - \frac{t_i}{b}\right) \cdot k_{board} \right]$$

$$k_z = 1 \bigg/ \left\{ \sum_{i=1}^{n} \left[ \frac{t_i}{b \cdot k_i} + \left(1 - \frac{t_i}{b}\right) \bigg/ k_{board} \right] \right\}$$

At block 725, proposed locations on the PCB 104 for each of the packages are heuristically selected by the user and entered through the user interface, such as the table 800C illustrated in FIG. 8C. Package geometry and power consumption data for each of the packages selected by the user for inclusion in a heuristically determined layout may also be input. Advantageously, in some embodiments, the positions and power modes for one or more of the selected packages may be manipulated in an effort to optimize the thermal efficiency of the heuristically determined layout.

Next, at decision block 735, the package size and locations are analyzed to verify that there is no physical interference between packages, i.e. the feasibility of the proposed layout is checked. If there is an instance of interference, then the "yes" branch is followed back to block 725 and the user is prompted to select a new location on the PCB 104 for one or more components in the heuristically determined layout. If no interference is determined, then the "no" branch proceeds to block 740.

At block 740, the thermal properties associated with each selected package in the layout are received from the user, such as through the table 800D illustrated in FIG. 8D. The power consumption for each selected package when operating under a given use case is also entered, such as through the table 800E illustrated in FIG. 8E. Notably, as would be understood by one of ordinary skill in the art, much if not all of the data described herein to be entered through the user interface by the user may be automatically queried in some embodiments based simply on user selection of one or more components.

At block 745, small geometry features are snapped such that similar features are treated in a like manner, thus reducing the size of the model during the subsequent finite element analysis. Advantageously, by snapping small features of the PCD and its various components so that point, line, and polygon features share coincident geometry, the thermal analysis of the layout can be streamlined. Snapping ensures integrity of the coincident geometry.

At block 750, element size and node density are selected such as, for example, an 8-node brick-like element as is known and understood in the art of discretization techniques. Notably, the systems and methods described herein are not limited such that a particular discretization technique must be included—variations in the approach for discretization, such as finite element analysis, will occur to those with skill in the art. A mesh of elements approximating the PCD and component layout is generated and a finite element analysis is executed at block 755. Execution of the FEA analysis by a simulation engine includes the generation of equations operable to solve for temperature under specified workloads. For example, where:

n=number of finite element nodes in the system once the mesh is generated

[K]: known system stiffness matrix with size n×n. It contains contributions of every element in the system {T}: unknown temperature vector to be solved at nodes with size n×1

{f}: known force vector with size n×1. It contains contributions of all heat generation source and ambient conditions $$[K] \cdot \{T\} = \{f\}$$

Based on the previous inputs, a thermal footprint for the given PCD and proposed layout is generated. As described above, the thermal footprint may be useful in heuristically evaluating and comparing the efficiency of various proposed layouts to dissipate thermal energy that is generated in connection with various use cases. In some embodiments, the thermal footprint may take the form of a map whereas in other embodiments it may be rendered via a table, such as the table 800F depicted in FIG. 8F.

Figure 9:
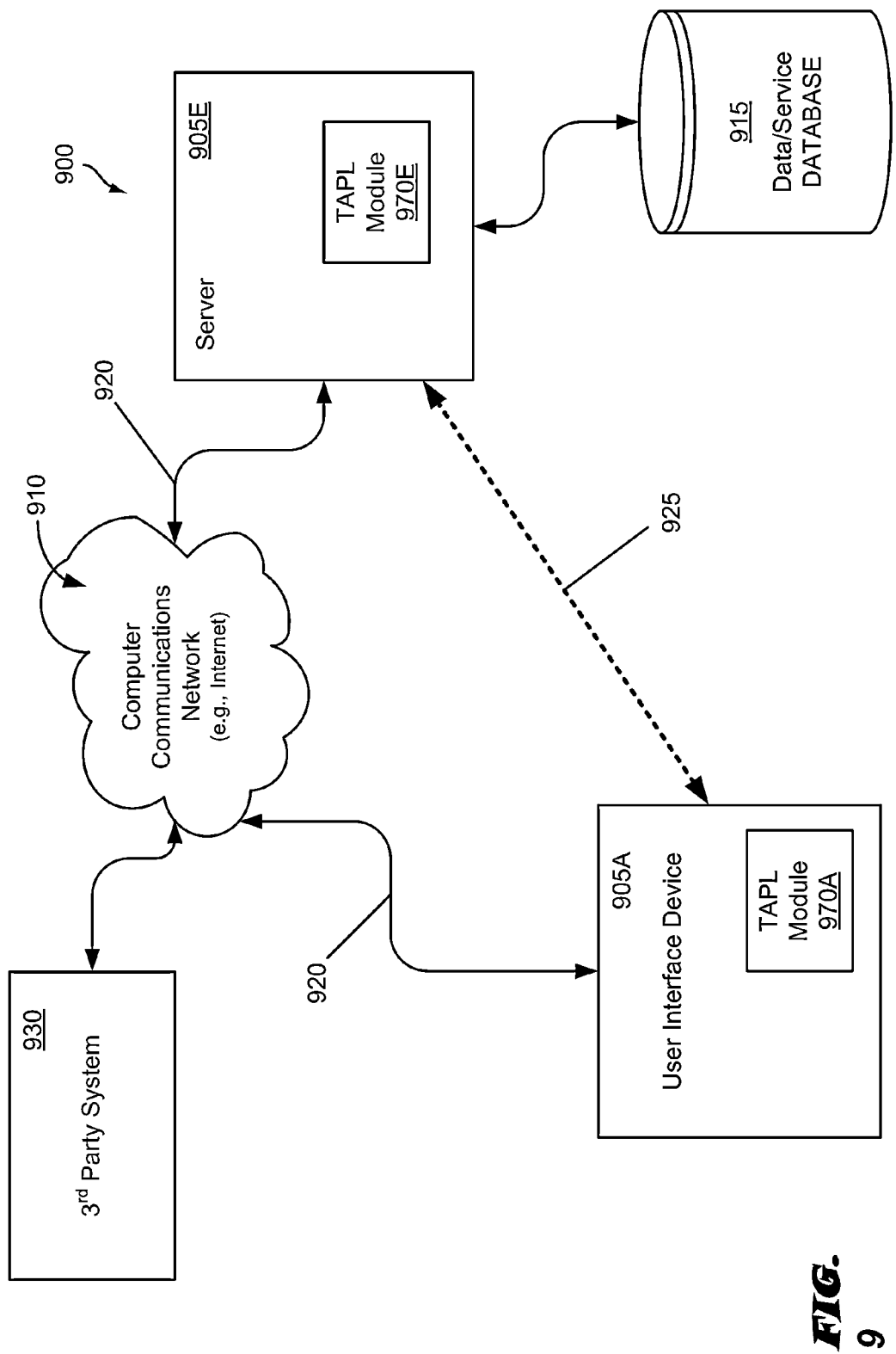
FIG. 9 is a functional block diagram of an exemplary architecture of a system for heuristic determination and thermal analysis of component placement on the PCB of FIG. 1.

FIG. 9 is a functional block diagram of an exemplary architecture of a system for heuristic determination and thermal analysis of component placement on the PCB 104 of FIG. 1. Exemplary embodiments of a user interface device 905A that are configurable per the illustrated system 900 anticipate remote communication, real-time software updates, extended data storage, etc. Advantageously, embodiments configured for communication via a computer system such as the exemplary system 900 depicted in FIG. 9 may leverage the Internet for, among other things, software upgrades, content updates, $3^{rd}$ party database query, etc. Other data that may be useful in connection with a user interface device 905A, and accessible via the Internet or other networked system, will occur to those will skill in the art.

The computer system 900 can comprise a server 905E which can be coupled to a network 910 that can comprise a wide area network ("WAN"), a local area network ("LAN"), the Internet, or a combination of networks. The server 905E can be coupled to a data/service database 915 and/or third party system 930. The data/service database 915 can store various records related to, but not limited to, layout configurations, PCD specifications, package specifications, software updates, user's manuals, troubleshooting manuals, etc.

The server 905E can be coupled to the network 910. Through the network 910, the server 905E can communicate with various different user interface devices 905A that may be comprised of desktop or laptop computers, thin clients, handheld devices such as personal digital assistants ("PDAs"), cellular telephones or other smart devices. Each user interface device 905A can run or execute web browsing software in order to access the server 905E and its various applications. Any device which can access the network 910, whether directly or via tether to a complimentary device, can be a user interface device 905A according to the computer system 900. The user interface devices 905A can be coupled to the network 910 by various types of communication links 920. These communication links 920 can comprise wired as well as wireless links. The communication links 920 allow each of the user interface devices 905A to establish virtual links 925 with the server 905E.

FIG. 9 further illustrates a thermal analysis and package layout ("TAPL") module 970 that may execute the steps illustrated in FIG. 7. The TAPL module 970 may reside on a client 905A and/or the server 905E. Further details about the TAPL module 970 will be described below in connection with FIG. 10.

Figure 10:
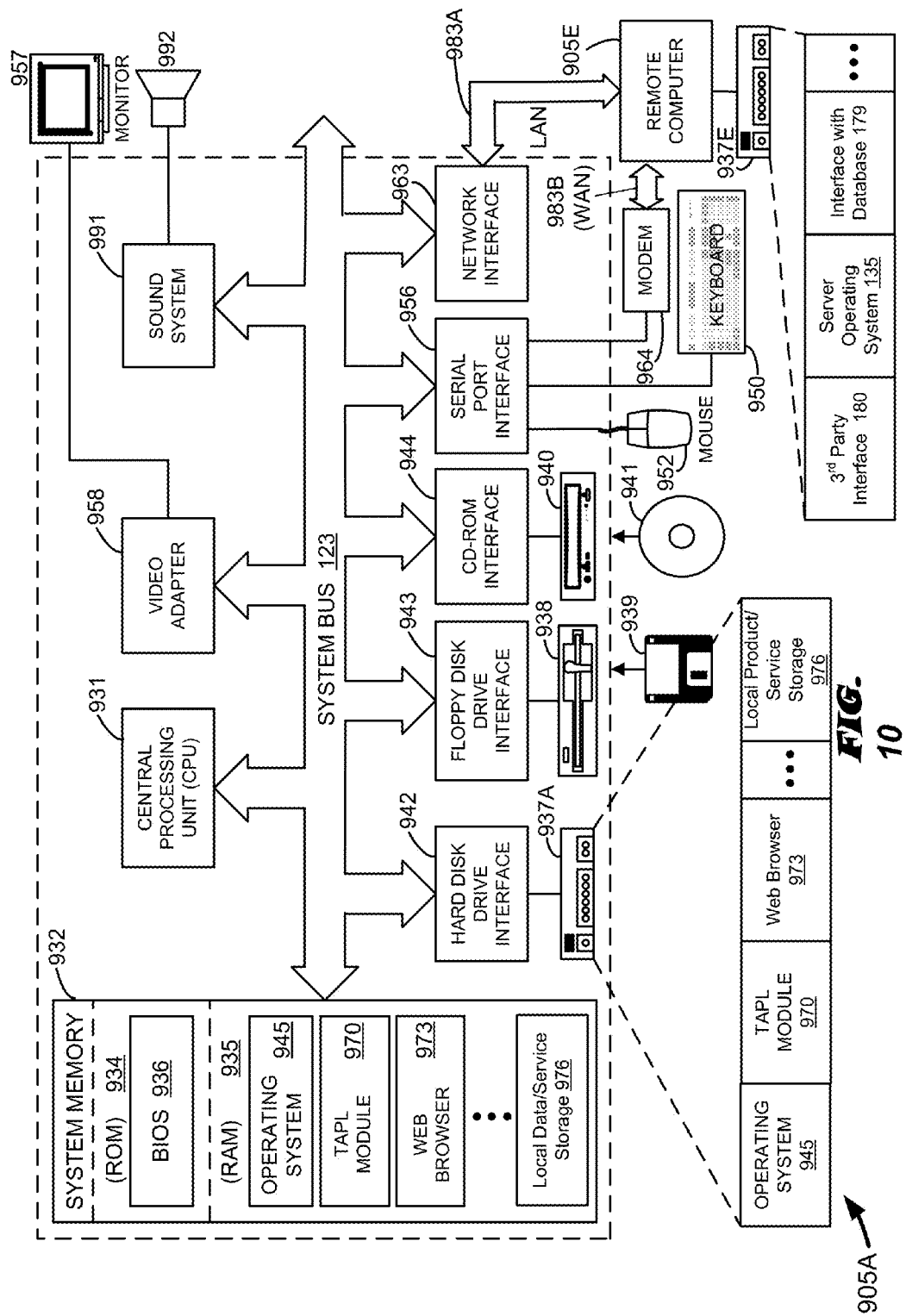
FIG. 10 is a functional block diagram of an exemplary user interface device operable to implement a method for heuristic determination and thermal analysis of component placement on the PCB of FIG. 1.

FIG. 10 is a functional block diagram of an exemplary user interface device 905A operable to implement a method for heuristic determination and thermal analysis of component placement on the PCB of FIG. 1. Alternatively, the user interface device 905A may communicate with server 905E such that server 905E implements a method for heuristic determination and thermal analysis of component placement on the PCB of FIG. 1. The exemplary operating environment for the system 900 includes a general-purpose computing device in the form of a conventional computer. Generally, the user interface device 905A includes a processing unit 931, a system memory 932, and a system bus 933 that couples various system components including the system memory 932 to the processing unit 931.

The system bus 933 may be any of several types of bus structures including a memory bus or memory controller, a peripheral bus, and a local bus using any of a variety of bus architectures. The system memory includes a read-only memory (ROM) 934 and a random access memory (RAM) 935. A basic input/output system (BIOS) 936, containing the basic routines that help to transfer information between elements within user interface device 905A, such as during start-up, is stored in ROM 934.

The user interface device 905A, which may be a computer, can include a hard disk drive 937A for reading from and writing to a hard disk, not shown, and a memory card drive 938 for reading from or writing to a removable memory 939, such as a memory card, and an optical disk drive 940 for reading from or writing to a removable optical disk 941 such as a CD-ROM or other optical media. Hard disk drive 937A, and memory card drive 938, and optical disk drive 140 are connected to system bus 933 by a hard disk drive interface 952, a memory card drive interface 943, and an optical disk drive interface 944, respectively.

Although the exemplary environment described herein employs a hard disk 937A, and a removable memory card 939, and removable optical disk 941, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment without departing from the scope of the invention. Such uses of other forms of computer readable media besides the hardware illustrated will be used in smaller user interface devices 905A such as in cellular phones, personal digital assistants (PDAs) and/or thin clients. The drives and their associated computer readable media illustrated in FIG. 10 provide nonvolatile storage of computer-executable instructions, data structures, program modules, and other data for computer or user interface device 905A.

A number of program modules may be stored on hard disk 937, memory card 939, optical disk 941, ROM 934, or RAM 935, including an operating system 945, a thermal analysis and package layout ("TAPL") module 970, a web browser 973, and a local data/service database 976. Program modules include routines, sub-routines, programs, objects, components, data structures, etc., which perform particular tasks or implement particular abstract data types. Aspects of the methods may be implemented in the form of a downloadable, client-side, browser based solutions TAPL module 970 which is executed by the central processing unit 931A of the user interface device 905A in order to provide a thermal footprint.

A user may enter commands and information into a user interface device 905A through input devices, such as a keyboard 950, a pointing device 952, a touch activated monitor 957 or other input means. Pointing devices may include a mouse, a trackball, and an electronic pen that can be used in conjunction with an electronic tablet. Other input devices (not shown) may include a microphone, joystick, game pad, an audio activated device, a PS3 or other game controller, satellite dish, scanner, or the like. These and other input devices are often connected to processing unit 931 through a serial port interface 956 that is coupled to the system bus 933, but may be connected by other interfaces, such as a parallel port, game port, a universal serial bus (USB), wireless port or the like.

The display 957 may also be connected to system bus 933 via an interface, such as a video adapter 958. The display 957 can comprise any type of display devices such as a liquid crystal display (LCD), a plasma display, an organic light-emitting diode (OLED) display, and a cathode ray tube (CRT) display. The audio adapter 991 interfaces to and drives another alert element 992, such as a speaker or speaker system, buzzer, bell, etc.

The user interface device 905A, comprising a computer, may operate in a networked environment using logical connections to one or more remote computers, such as the server 905E. A remote computer may be another personal computer, a server, a client, a router, a network PC, a peer device, or other common network node. While the server 905E or a remote computer typically includes many or all of the elements described above relative to the user interface device 905A, only a memory storage device 937E has been illustrated in the Figure. The logical connections depicted in the Figure include a local area network (LAN) 983A and a wide area network (WAN) 983B. Such networking environments are commonplace in offices, enterprise-wide computer networks, satellite networks, telecommunications networks, intranets, and the Internet.

When used in a LAN networking environment, the user interface device 905A, comprising a computer, may be coupled to the local area network 983A through a network interface or adapter 963. When used in a WAN networking environment, the user interface device 905A, comprising a computer, typically includes a modem 964 or other means for establishing communications over WAN 983B, such as the Internet. Modem 964, which may be internal or external, is connected to system bus 933 via serial port interface 956. In a networked environment, program modules depicted relative to the server 905E, or portions thereof, may be stored in the remote memory storage device 937E. It will be appreciated that the network connections shown are exemplary and other means of establishing a communications link between the computers may be used.

Moreover, those skilled in the art will appreciate that the present invention may be implemented in other computer system configurations, including hand-held devices, multi-processor systems, microprocessor based or programmable consumer electronics, network personal computers, mini-computers, mainframe computers, and the like. The invention may also be practiced in distributed computing environments, where tasks are performed by remote processing devices that are linked through a communications network. In a distributed computing environment, program modules may be located in both local and remote memory storage devices.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter," "then," "next," "subsequent," etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the drawings, which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made without departing from the spirit and scope of the present invention, as defined by the following claims.

What is claimed is:

1. A method for heuristic determination and thermal analysis of component placement on a printed circuit board ("PCB") for use in a portable computing device ("PCD"), the method comprising:
receiving at a computer one or more selections of PCBs suitable for use in the PCD;
receiving at the computer one or more thermal energy generating components to reside on the PCB, wherein receiving a thermal energy generating component includes the entry of specification data associated with the component;
heuristically determining with the computer a plurality of layouts for the selected one or more thermal energy generating components on the PCB;
receiving at the computer a selection of one or more use cases under which the heuristically determined layouts of components will be evaluated, wherein each use case includes the entry of performance data associated with the selected thermal energy generating components; and
evaluating with the computer the heuristically determined layouts by generating a predicted thermal footprint for each layout according to each use case, wherein a use case is associated with one of gaming, graphical data transceiving, voice data transceiving, and video recording.

2. The method of claim 1, further comprising:
analyzing the predicted thermal footprints and identifying the layout that will provide the most thermally efficient performance.

3. The method of claim 1, further comprising:
analyzing the predicted thermal footprints;
modifying one or more of the heuristically determined layouts; and
evaluating the one or more modified layouts.

4. The method of claim 1, wherein the specification data associated with a component comprises dimensional data.

5. The method of claim 1, wherein the specification data associated with a component comprises material of construction data.

6. The method of claim 1, wherein the performance data comprises power consumption data.

7. The method of claim 1, wherein the heuristically determined layouts are evaluated via application of finite element analysis.

8. The method of claim 1, wherein a layout of thermal energy generating components dictates that each side of the selected PCB comprises one or more thermal energy generating components.

9. The method of claim 1, wherein the PCD is a mobile telephone.

10. A computer system for heuristic determination and thermal analysis of component placement on a printed circuit board ("PCB") for use in a portable computing device ("PCD"), the system comprising:
a user interface to a computing device for:
receiving one or more selections of PCBs suitable for use in the PCD;
receiving one or more thermal energy generating components to reside on the PCB, wherein receiving a thermal energy generating component includes the entry of specification data associated with the component;
heuristically determining a plurality of layouts for the selected one or more thermal energy generating components on the PCB;
receiving a selection of one or more use cases under which the heuristically determined layouts of components will be evaluated, wherein each use case includes the entry of performance data associated with the selected thermal energy generating components; and
a processor for:
evaluating the heuristically determined layouts by generating a predicted thermal footprint for each layout according to each use case, wherein a use case is associated with one of gaming, graphical data transceiving, voice data transceiving, and video recording.

11. The system of claim 10, further comprising:
analyzing the predicted thermal footprints and identifying the layout that will provide the most thermally efficient performance.

12. The system of claim 10, further comprising:
analyzing the predicted thermal footprints;
modifying one or more of the heuristically determined layouts; and
evaluating the one or more modified layouts.

13. The system of claim 10, wherein the specification data associated with a component comprises dimensional data.

14. The system of claim 10, wherein the specification data associated with a component comprises material of construction data.

15. The system of claim 10, wherein the performance data comprises power consumption data.

16. The system of claim 10, wherein the heuristically determined layouts are evaluated via application of finite element analysis.

17. The system of claim 10, wherein a layout of thermal energy generating components dictates that each side of the selected PCB comprises one or more thermal energy generating components.

18. The system of claim 10, wherein the PCD is a mobile telephone.

19. A computer system for heuristic determination and thermal analysis of component placement on a printed circuit board ("PCB") for use in a portable computing device ("PCD"), the system comprising:
means for receiving one or more selections of PCBs suitable for use in the PCD;
means for receiving one or more thermal energy generating components to reside on the PCB, wherein receiving a thermal energy generating component includes the entry of specification data associated with the component;
means for heuristically determining a plurality of layouts for the selected one or more thermal energy generating components on the PCB;
means for receiving a selection of one or more use cases under which the heuristically determined layouts of components will be evaluated, wherein each use case includes the entry of performance data associated with the selected thermal energy generating components; and
means for evaluating the heuristically determined layouts by generating a predicted thermal footprint for each layout according to each use case, wherein a use case is associated with one of gaming, graphical data transceiving, voice data transceiving, and video recording.

20. The system of claim 19, further comprising:
means for analyzing the predicted thermal footprints and identifying the layout that will provide the most thermally efficient performance.

21. The system of claim 19, further comprising:
means for analyzing the predicted thermal footprints;
means for modifying one or more of the heuristically determined layouts; and
means for evaluating the one or more modified layouts.

22. The system of claim 19, wherein the specification data associated with a component comprises dimensional data.

23. The system of claim 19, wherein the specification data associated with a component comprises material of construction data.

24. The system of claim 19, wherein the performance data comprises power consumption data.

25. The system of claim 19, wherein the heuristically determined layouts are evaluated via application of finite element analysis.

26. The system of claim 19, wherein a layout of thermal energy generating components dictates that each side of the selected PCB comprises one or more thermal energy generating components.

27. The system of claim 19, wherein the PCD is a mobile telephone.

28. A computer program product comprising a non-transitory computer usable medium having a computer readable program code embodied therein, said computer readable program code adapted to be executed to implement a method for heuristic determination and thermal analysis of component placement on a printed circuit board ("PCB") for use in a portable computing device ("PCD"), said method comprising:
receiving one or more selections of PCBs suitable for use in the PCD;
receiving one or more thermal energy generating components to reside on the PCB, wherein receiving a thermal energy generating component includes the entry of specification data associated with the component;
heuristically determining a plurality of layouts for the selected one or more thermal energy generating components on the PCB;
receiving a selection of one or more use cases under which the heuristically determined layouts of components will be evaluated, wherein each use case includes the entry of performance data associated with the selected thermal energy generating components; and
evaluating the heuristically determined layouts by generating a predicted thermal footprint for each layout according to each use case, wherein a use case is associated with one of gaming, graphical data transceiving, voice data transceiving, and video recording.

29. The computer program product of claim 28, wherein the program code implementing the method further comprises:
analyzing the predicted thermal footprints and identifying the layout that will provide the most thermally efficient performance.

30. The computer program product of claim 28, wherein the program code implementing the method further comprises:
analyzing the predicted thermal footprints;
modifying one or more of the heuristically determined layouts; and
evaluating the one or more modified layouts.

31. The computer program product of claim 28, wherein the specification data associated with a component comprises dimensional data.

32. The computer program product of claim 28, wherein the specification data associated with a component comprises material of construction data.

33. The computer program product of claim 28, wherein the performance data comprises power consumption data.

34. The computer program product of claim 28, wherein the heuristically determined layouts are evaluated via application of finite element analysis.

35. The computer program product of claim 28, wherein a layout of thermal energy generating components dictates that each side of the selected PCB comprises one or more thermal energy generating components.

36. The computer program product of claim 28, wherein the PCD is a mobile telephone.

\* \* \* \* \*